Patented Sept. 9, 1952

2,610,212

UNITED STATES PATENT OFFICE 2,610,212

SYNTHESIS OF AMINO ACIDS

Don E. Floyd, Minneapolis, Minn., assignor to General Mills, Inc., a corporation of Delaware No Drawing. Application April 24, 1950, Serial No. 157,851

7 Claims. (Cl. 260—534)

The present invention relates to the synthesis of amino acids by the reductive amination of keto acids and salts thereof. The present application is a continuation-in-part of my copending application, Serial No. 683,165, filed July 12, 1946, entitled Synthesis of Amino Acids.

Various attempts have been made to synthesize amino acids, but many of the previous methods have entailed a number of disadvantages. One of the principal disadvantages was the necessity of conducting a long series of reactions in order to obtain the desired product. Furthermore, the various steps in some of these syntheses were difficult to carry out, and in many cases involved prohibitive expense and resulted in low yields of the desired product. Knoop and Oesterlin, Zeit. Physiol. Chem. vol. 148, 294 (1925), produced amino acids by the reductive amination of various keto acids in the presence of a palladium catalyst at room temperature and low hydrogen pressure, using aqueous or alcoholic ammonia solutions. These aminations resulted in low yields in many instances. For example, in the reductive amination of alpha-keto glutaric acid, a 23% yield of glutamic acid was obtained.

It has now been discovered that it is possible to produce amino acids and amino acid derivatives in decidedly improved yields by reductive amination in the presence of small amounts of inexpensive catalysts and at elevated temperatures and pressures.

It is therefore an object of the present invention to provide a novel process of producing amino acids by the reductive amination of keto acids in the presence of small amounts of inexpensive catalysts and at elevated temperatures and pressures.

This and other objects of the present invention will be more fully apparent from the following description of the invention with particular reference to the specific examples which are to be considered as illustrative only.

The keto acids and salts thereof to which the present invention is directed are the aliphatic keto acids containing from 5 to 19 carbon atoms. They may contain 1 or more carboxyl groups. The keto group may be alpha to a carboxyl group, or may be at any other position in the molecule. Typical of the acids contemplated for use in the present invention are alpha-keto glutaric acid, levulinic acid, alpha-keto nonanoic acid, and alpha-keto nonadecanoic acid. The acid may be employed in the form of the free acid or in the form of a salt soluble in the reaction mixture under the reaction conditions. Suitable salts include the alkali metal salts, sodium, potassium, the ammonim salts, and alkaline earth metal salts such as calcium and barium salts.

In general, the reductive amination is conconducted at elevated pressures and at elevated temperatures in the presence of a hydrogenation catalyst. Pressures of 200 pounds per square inch and upwards to 3000 pounds per square inch and more are suitable. Higher pressures up to 10,000 pounds per square inch may be used but the improvement in operation at such higher pressures usually does not warrant the added manipulative difficulties encountered at such pressures.

Temperatures are preferably held within the range of 50–200° C. and within this range the range of 80–110° C. is most desirable. Where the keto group is on the alpha-carbon or beta-carbon atom, it is preferred not to exceed about 150° C.; whereas with the keto group in other positions temperatures up to 200° C. are suitable without any material adverse effect upon the reactants.

The reaction is carried out in the presence of an active nickel hydrogenation catalyst. This may be any of a wide variety of commercially available nickel catalysts, typical of which are pyrophoric catalysts such as Raney nickel and similar catalysts. Other suitable nickel hydrogenation catalysts are those made by the reduction of nickel salts and oxides such as nickel nitrate, formate, carbonates, oxides and the like. These reduced nickel catalysts are frequently deposited on inert carriers such as various earths, kieselguhr, alumina, and the like. In place of the earth type of carrier, other carriers such as hydrogenated fatty oils may be used.

The concentration of nickel hydrogenation catalyst may be varied over a wide range, depending on the activity of the particular catalyst being used and the ease of reduction of the particular keto acid. It is preferred that the ratio of catalyst to keto acid be in the range of 5–15 grams of catalyst to one mole of keto acid. However, as little as 1 g. of the highly active Raney nickel is sufficient for reduction of 1 mole of most keto acids. On the other hand, 25 to 50 g. of nickel catalyst per mole of keto acid may be used, if desired, although there is no particular advantage of using such a high ratio with most keto acids, and the added manipulations and expense required make such high ratios less desirable.

In the reduction a considerable excess of hydrogen should be present to force the reaction to completion and to increase its velocity. The particular concentration of hydrogen is not important except that a large excess should be used. It is also important to have an excess of ammonia for the same reason and also in order to suppress the formation of the secondary amine. The hydrogen should be introduced in the form of a gas but the ammonia may be in the form of either a gas or a liquid. In many instances water is found to be a very desirable solvent for reaction since many keto acids and their salts are fairly soluble in water, while the resultant amino acids may be much less soluble. This is particularly true of alpha-keto glutaric acid and the final product, glutamic acid. It is also possible to use other solvents such as methanol, ethanol, and the like, which do not undergo reaction with the other reactants.

The following examples will serve to illustrate the invention:

Example 1

Thirty-six and five-tenths grams (one-fourth mole) of alpha-keto glutaric acid was dissolved in 200 cc. of water. The pH of the solution was adjusted to approximately 8 by the addition of 30% potassium hydroxide solution. The resulting solution was cooled to about 15° C. and saturated with ammonia gas. Then two grams of Raney nickel catalyst was added and the mixture was placed in a small hydrogenation bomb. The reaction was conducted at a hydrogen pressure of 2,000 pounds per square inch and a temperature of 105–8° C. for about 3½ hours. At the end of this time no more hydrogen was absorbed. About 88% of the theoretical amount of hydrogen was taken up during the reaction as shown by the decrease in pressure. The bomb was cooled to room temperature and the catalyst was filtered off and removed. The filtrate was concentrated and excess ammonia evaporated off in vacuum until the volume reached about 150 cc. The pH was adjusted to approximately 3 by the addition of concentrated hydrochloric acid. When the solution was refrigerated, colorless crystals which soon appeared were filtered off and dried in vacuum. The weight of the crystals was 19.9 grams. They melted at 194–5° C. A mixed melting point with authentic dl-glutamic acid showed no depression. A Kjeldahl analysis of the product showed 9.4% nitrogen while the calculated value is 9.5% nitrogen. Further concentration of the mother liquor gave only potassium chloride.

Example 2

Twenty-nine and two-tenths grams (two-tenths mole) of alpha-keto glutaric acid was dissolved in 100 cc. of water. The pH of the solution was adjusted to approximately 9 with 30% potassium hydroxide solution. The solution was diluted to about 200 cc. with water, cooled to 5° C. and then saturated with ammonia gas. One gram of Raney nickel catalyst was added and the mixture was placed in a small hydrogenation bomb. The reaction was conducted at a hydrogen pressure of 2,000 pounds per square inch and about 150–60° C. for three hours. At the end of this time no more hydrogen was absorbed. About 84% of the theoretical amount of hydrogen was taken up during the reaction as shown by the decrease in pressure. The solution was cooled to room temperature and the catalyst was removed by filtration. The solution was then concentrated and the excess ammonia evaporated off until the volume reached about 125 cc. The pH was now adjusted to about 3 with concentrated hydrochloric acid. Upon cooling, colorless crystals were obtained. After filtration and vacuum drying a yield of 10.4 grams of glutamic acid was obtained. The crystals melted at 195–6° C. and a mixed melting point with authentic dl-glutamic acid showed no depression. Further concentration of the mother liquor gave only inorganic salts.

Example 3

One hundred and sixteen grams (1 mole) of levulinic acid was dissolved in 100 ml. of water. To the solution was added 40 g. (1 mole) of sodium hydroxide dissolved in 100 ml. of water. It was diluted to about 450 ml. with concentrated ammonium hydroxide and then saturated with ammonia gas at about 10° C. The ammoniacal solution and 5 g. of Raney nickel catalyst were sealed in a one-liter, high pressure hydrogenation bomb. The reaction was conducted at a hydrogen pressure of about 1300 pounds per square inch and a temperature of 80–100° C. After about thirty minutes hydrogen was no longer absorbed. The bomb was cooled and the contents filtered to remove the catalyst. After evaporation of the ammonia the pH of the filtrate was adjusted to about 7 and the water was distilled off in vacuo. The dry residue was refluxed with 300 ml. of ethanol saturated with hydrogen chloride gas for one and one-half hours. It was filtered to remove sodium chloride and then concentrated under reduced pressure to remove ethanol and excess hydrogen chloride. The residual liquid, consisting of the hydrochloride salt of ethyl gamma-aminovalerate, solidified upon standing. The solid melted at 90° C. The yield was 111 g. or 61% of the theoretical. When a small portion of this compound was hydrolyzed with hydrochloric acid, there was obtained gamma-aminovaleric acid hydrochloride, melting at 155–6° C.

Example 4

A solution of 77.3 g. (⅔ mole) of levulinic acid in 100 ml. of water was added to a solution of 57.1 g. (⅓ mole) of barium hydroxide in 100 ml. of warm water. The solution was diluted to 500 ml. with concentrated ammonium hydroxide, cooled and saturated with ammonia gas. Then the ammoniacal solution and 4 g. of Raney nickel catalyst were placed in a one-liter, high pressure hydrogenation bomb. The mixture was reduced at a hydrogen pressure of about 1300 pounds per square inch and a temperature of about 90° C. After about one and one-half hours reduction was complete. The bomb was cooled and the catalyst filtered off. After evaporation of the ammonia the solution was treated with gaseous carbon dioxide until no more barium carbonate precipitated. The precipitate was filtered off and washed. The filtrate and washing were combined and then concentrated under reduced pressure until crystals began to appear. The mixture was refrigerated and the crystals that formed were separated and dried. The gamma-aminovaleric acid weighed 56.1 g. (amounting to a yield of 72%) and melted at 204–5° C.

Example 5

14.6 grams (.1 mole) of alpha-keto glutaric acid was dissolved in a solution containing 8 g.

of sodium hydroxide in 50 ml. of water. The solution was saturated with ammonia gas at about 10° C. Then it was diluted with 100 ml. of concentrated ammonium hydroxide and charged into the hydrogenation bomb along with 1.5 g. of a nickel on kieselguhr catalyst (50% nickel) in pulverized form. Hydrogenation was conducted at an initial pressure of about 1600 pounds per square inch. Reduction took place in the range of 80–100° C. The reaction mixture was worked up as in Examples 1 and 2 and there was obtained 8.5 g. of glutamic acid. This amounts to a yield of about 58% of theoretical.

*Example 6*

43 grams (¼ mole) of alpha-keto nonanoic acid was dissolved in a solution of 14 g. of potassium hydroxide in a mixture of 200 ml. of water and 200 ml. of ethanol. The solution was saturated with ammonia gas at about 10° C. and was placed in the hydrogenation bomb along with about 3 g. of Raney nickel catalyst. Hydrogenation was conducted at an initial pressure of about 500 pounds per square inch, and reduction took place in the range of 50–80° C. The mixture was removed from the bomb, the catalyst filtered off, and the excess ammonia evaporated from the solution. The alpha-amino nonanoic acid was obtained upon adjusting the pH of the solution to about 7. The yield was 24.05 g. of amino acid which amounts to 56% of the theoretical. It melted with decomposition at 253–5° C.

*Example 7*

A solution of 20.7 g. of metallic sodium in 250 ml. of absolute ethanol was prepared and to it was added 500 g. of ethyl oxalate and 268.3 g. of ethyl stearate. The mixture was heated at 50–60° C. while ethanol was continuously distilled off over a period of about two hours at about 100 mm. pressure. Then the excess ethyl oxalate was distilled off and recovered (B. P. 72–4° C./10 mm.). The reaction product was acidified at about 50° C. with 55 g. of acetic acid and was washed with water, leaving the product, ethyl alpha-ethoxalylstearate. This was hydrolyzed without further purification by refluxing with a mixture of 600 g. of concentrated hydrochloric acid and 1200 g. of water for 11½ hours. The organic layer was separated and washed with water while warm. The alpha-keto nonadecanoic acid solidified to a waxy solid at room temperature. The yield was 304 g. or 98% of the theoretical.

31.2 grams (.1 mole) of alpha-keto nonadecanoic acid was dissolved in a solution of 6.7 g. of potassium hydroxide in a mixture of 200 ml. of water and 200 ml. of ethanol. This solution was saturated with ammonia gas at about 10° C. and then placed in the hydrogenation bomb along with 4 g. of a reduced nickel catalyst (Rufert nickel flake catalyst—24.88% reduced nickel on hydrogenated oil—oil removed by washing with hot ethanol). Hydrogenation was conducted at an initial pressure of 1000 pounds per square inch and reduction took place in the temperature range of about 50–80° C. The reaction mixture was worked up as in the previous example and was finally freed of traces of nickel catalyst by means of acetic acid solvent. The yield of the crude alpha-amino nonadecanoic acid amounted to 22.04 g. or 70.6% of the theoretical.

I claim as my invention:

1. Process for the production of amino acids by the reductive amination of compounds selected from the group consisting of aliphatic keto acids containing from 5 to 19 carbon atoms, and salts thereof, which comprises reacting said compound with hydrogen and ammonia at a hydrogen pressure of at least 200 pounds per square inch at a temperature within the approximate range of 50–200° C. in the presence of a nickel hydrogenation catalyst employed in a low molar ratio.

2. Process for the production of amino acids by the reductive amination of compounds selected from the group consisting of aliphatic keto acids containing from 5 to 19 carbon atoms, and salts thereof, which comprises reacting said compound with hydrogen and ammonia at a hydrogen pressure in the approximate range of 200–3000 pounds per square inch at a temperature within the approximate range of 80–110° C. and in the presence of a nickel hydrogenation catalyst employed in a low molar ratio.

3. Process for the production of glutamic acid by the reductive amination of alpha-keto glutaric acid which comprises reacting alpha-keto glutaric acid with hydrogen and ammonia at a hydrogen pressure within the approximate range of 200–3000 pounds per square inch in the presence of a nickel hydrogenation catalyst in a low molar ratio and at a temperature within the approximate range of 80–110° C.

4. Process for the production of gamma-amino valeric acid by the reductive amination of levulinic acid which comprises reacting levulinic acid with hydrogen and ammonia at a hydrogen pressure within the approximate range of 200–3000 pounds per square inch in the presence of a nickel hydrogenation catalyst in a low molar ratio and at a temperature within the approximate range of 80–110° C.

5. Process for the production of amino acids by the reductive amination of compounds selected from the group consisting of aliphatic keto acids containing from 5 to 19 carbon atoms, and salts thereof, which comprises reacting said compound with hydrogen and ammonia at a hydrogen pressure in the approximate range of 200–3000 pounds per square inch at a temperature within the approximate range of 80–110° C. and in the presence of a Raney nickel hydrogenation catalyst employed in a low molar ratio.

6. Process for the production of amino acids by the reductive amination of compounds selected from the group consisting of aliphatic keto acids containing from 5 to 19 carbon atoms, and salts thereof, which comprises reacting said compound with hydrogen and ammonia at a hydrogen pressure in the approximate range of 200–3000 pounds per square inch at a temperature within the approximate range of 80–110° C. and in the presence of a nickel on kieselguhr hydrogenation catalyst employed in a low molar ratio.

7. Process for the production of amino acids by the reductive amination of compounds selected from the group consisting of aliphatic keto acids containing from 5 to 19 carbon atoms, and salts thereof, which comprises reacting said compound with hydrogen and ammonia at a hydrogen pressure in the approximate range of 200–3000 pounds per square inch at a temperature within the approximate range of 80–110° C. and in the presence of a nickel in hydrogenated fatty oil hydrogenation catalyst employed in a low molar ratio.

DON E. FLOYD.

(References on following page)

REFERENCES CITED

The following references are of record in the file of this patent:

UNITED STATES PATENTS

| Number | Name | Date |
|---|---|---|
| 1,628,190 | Raney | May 10, 1927 |

FOREIGN PATENTS

| Number | Country | Date |
|---|---|---|
| 57,807 | Netherlands | July 15, 1946 |

OTHER REFERENCES

Gutknecht, Ber. Deut. Chem., vol. 13, p. 1116 (1880).

Knoop et al., Zeit. Physiol. Chem., vol. 148, pp. 294–315 (1925).

Knoop et al., Zeit. Physiol. Chem., vol. 170, pp. 186–211 (1927).

Skita et al., Liebig's Ann., vol. 453, pp. 190–210 (1927).

Aubel et al., Compt. rend., vol. 186, pp. 1844–1846 (1928).

Desnuelle et al., Bull. Soc. Chim., vol. I, pp. 700–702 (1934).

Schoenheimer et al., J. Biol. Chem., vol. 127, pp. 301–313 (1939).

Block, Chem. Rev., vol. 38 pp. 533–534 (1946).

Christian et al., J. Am. Chem. Soc., vol. 69 pp. 1961–1963 (1947).